United States Patent [19]
Brandstetter et al.

[11] Patent Number: 5,327,370
[45] Date of Patent: Jul. 5, 1994

[54] CIRCULARLY SCANNED ELECTRONICALLY ADDRESSED OPTICAL CORRELATOR

[75] Inventors: Robert W. Brandstetter, Levittown; Nils J. Fonneland, Lake Ronkonkoma, both of N.Y.

[73] Assignee: Grumman Aerospace Corporation, Bethpage, N.Y.

[21] Appl. No.: 804,019

[22] Filed: Dec. 9, 1991

[51] Int. Cl.⁵ .............................. G06E 3/00
[52] U.S. Cl. ........................ 364/822; 382/31
[58] Field of Search .............. 364/822; 382/31; 359/29

[56] References Cited

U.S. PATENT DOCUMENTS

| | | | |
|---|---|---|---|
| 3,779,492 | 12/1973 | Grumet | 244/3.17 |
| 4,471,445 | 9/1984 | Pernick | 364/485 |
| 4,490,849 | 12/1984 | Grumet et al. | 382/31 |
| 4,838,644 | 6/1989 | Ochoa et al. | 350/162.13 |
| 4,980,922 | 12/1990 | Leib | 382/31 |
| 5,040,140 | 8/1991 | Horner | 364/822 |
| 5,175,775 | 12/1992 | Iwaki et al. | 382/31 |
| 5,185,815 | 2/1993 | Brandstetter | 382/31 |

OTHER PUBLICATIONS

J. Mendelsohn et al., "Digital Analysis of the Effects of Terrain Clutter on the Performance of Matched Filters for Target Identification and Location", 1979, SPIE vol. 186, pp. 190-196.

Primary Examiner—Tan V. Mai
Attorney, Agent, or Firm—Bacon & Thomas

[57] ABSTRACT

A system for identifying and determining the orientation and location of multiple objects includes a camera and a mechanism for permitting the camera to scan a scene containing the objects. Objects in the moving scene are identified by optical filtering. Filters representing each of the objects to be identified are stored in a digital image memory, from which they are retrieved as needed, Fourier transformed, and loaded into a spatial light modulator to form a matched filter for an input image modulated and transformed laser beam.

21 Claims, 2 Drawing Sheets

CIRCULARLY SCANNED ELECTRONICALLY ADDRESSED OPTICAL CORRELATOR

BACKGROUND OF THE INVENTION

1. Field of the Invention

This invention relates to a system for identifying objects in a combined circularly scanned image and determining their location and orientation.

2. Description of the Related Art

A variety of optical and electronic image processing techniques have been developed for the purpose of automatically identifying objects in an image. Optical techniques are especially suitable for use in applications requiring real time processing of a large amount of image information. The filters and lenses used in such systems transform entire images at the speed of light, in contrast to purely electronic image processing systems which generally process image information serially, pixel by pixel.

A device known as the "spatial light modulator" (SLM) has recently become available for use in converting electronic information into optical form, using a coherent light beam as a carrier of the information. The SLM is essentially a filter whose optical characteristics are varied in response to an electrical input signal. This allows conversion of information from electronic to optical form, in a manner which optimizes the different advantages of electronic and optical systems in a combined electronic and optical image processing system.

Identification of objects in an image involves the process known as "matched filtering". This process is based upon a correlation function produced by taking the inverse Fourier transform of the Fourier transforms of an input image and a complex conjugate reference image. Various lens systems are currently available for performing the Fourier transform of image information contained in a coherent beam of light. Comparison of the images is accomplished by combining the Fourier transforms of each image. The resulting "correlation spots" are an indication of the degree of correlation between the two images. This type of optical matched filtering system is useful for comparing input images with a limited number of matched filters, but because the references images are conventionally stored in optical form, the system is much less useful in applications involving a greater number of reference images. These applications include parts retrieval systems, autonomous guidance and artificial intelligence systems for land, air and space vehicles, and surveillance systems.

SUMMARY OF THE INVENTION

It is an objective of the invention to provide a system for determining the location and orientation of a variety of objects in a moving image frame.

It is a second objective of the invention to provide a system for unambiguously detecting target objects in a moving image frame and determining their locations and orientations in coordinates which are user selectable.

It is a third objective of the invention to provide an optical matched filtering system capable of switching between a plurality of matched filters to selectively identify a plurality of objects in a circularly scanned input image.

It is a fourth objective of the invention to provide a means for interrogating an optical matched filter with moving scene images.

It is a fifth objective of the invention to provide an optical filter image memory for sequential processing and detection of input scenes containing a multiplicity of objects for use in automated parts retrieval systems, autonomous guidance and artificial intelligence systems, and surveillance systems.

These objectives are achieved by providing a system in which images are processed by a spatial light modulator to form optical filters used in an optical correlator. Input imagery is obtained from a television camera that circularly scans a scene in a direction transverse to the optical axis of the camera. Subsequent interrogation of the optical filters with scene imagery from the camera yields a correlation function which identifies selected objects in the input imagery. When an object is detected, the target coordinates of the object are determined based on the camera rotation angle. The optical filter information is stored electronically in the form of digital sequentially addressed images, which are individually supplied to the SLM upon command to form a matched filter for a selected object, the matched filter being interrogated by a laser beam modulated with the moving scene imagery information via a second SLM. The combination of sequentially formed optical filters with a circularly scanned input image provides the information necessary to obtain an object's location and orientation. False target detection is eliminated because there is only one optical matched filter at any instant which is selected from digital storage by command.

DETAILED DESCRIPTION OF THE PREFERRED EMBODIMENTS

Figure 1:
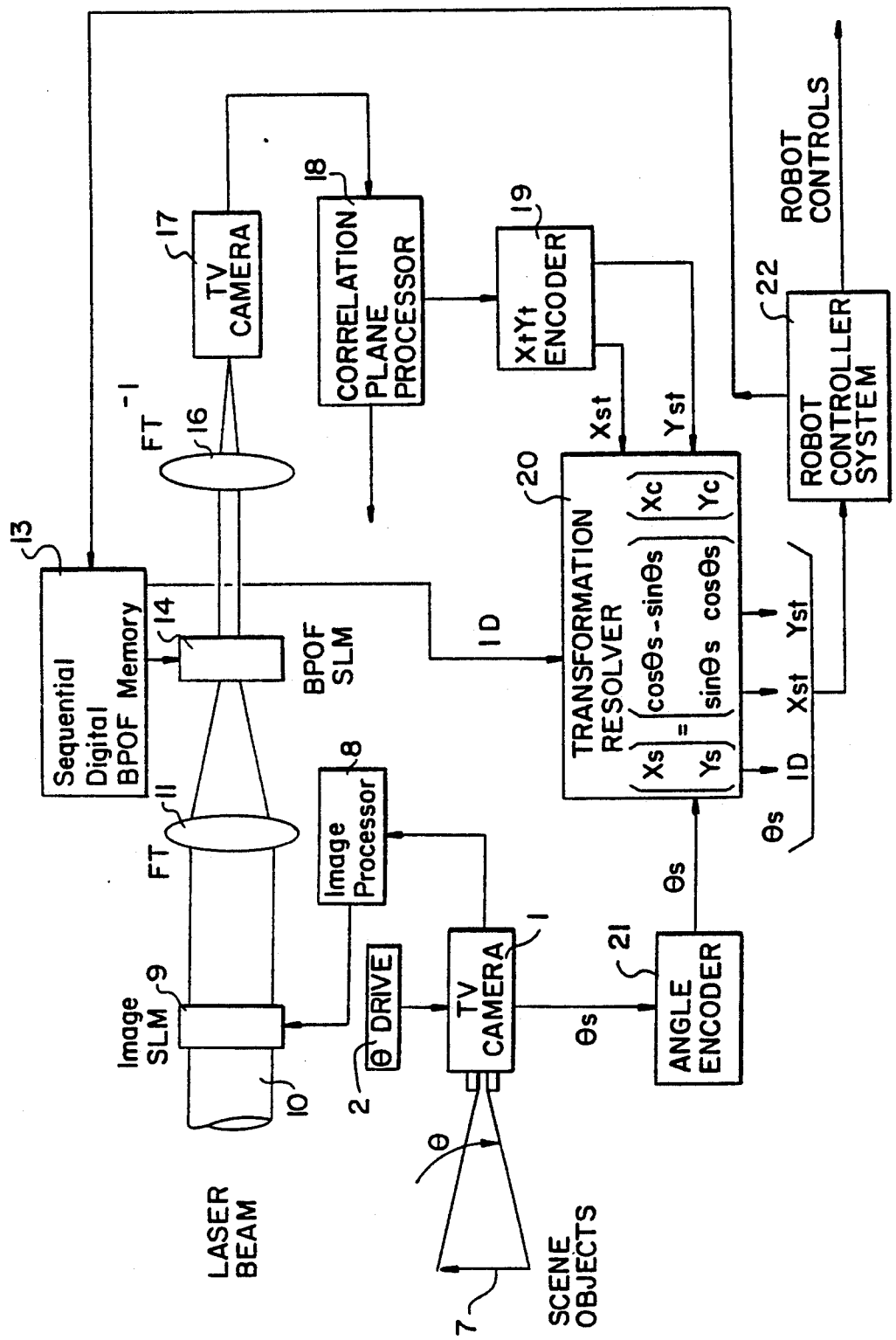
FIG. 1 is a schematic block diagram of a circularly scanned electronically addressed correlation system according to a preferred embodiment of the invention.

FIG. 1 is a schematic block diagram of a system for detecting, identifying, and locating the positions and orientations of multiple objects in a scene according to a preferred embodiment of the invention. Objects in the scene are scanned by a television camera 1 provided with a "$\theta$" drive 2 for rotating the camera imaging plane at a rate $\dot{\theta}$ about an axis transverse to the optical axis of the camera. Numerous mechanisms and devices are available for causing the camera to circularly scan the scene. The "$\theta$" drive for the camera may, for example, be obtained electronically by means of a digitally encoded and processed video or raster sine-cosine resolver, optically by means of a dove prism, or by mechanical rotation of the camera about its longitudinal axis. The scene may also be rotated electronically within an image preprocessor 8, described below. Alternatively, the camera may be fixed in a moving or rotating object such as a satellite or weapons system.

Figure 3:
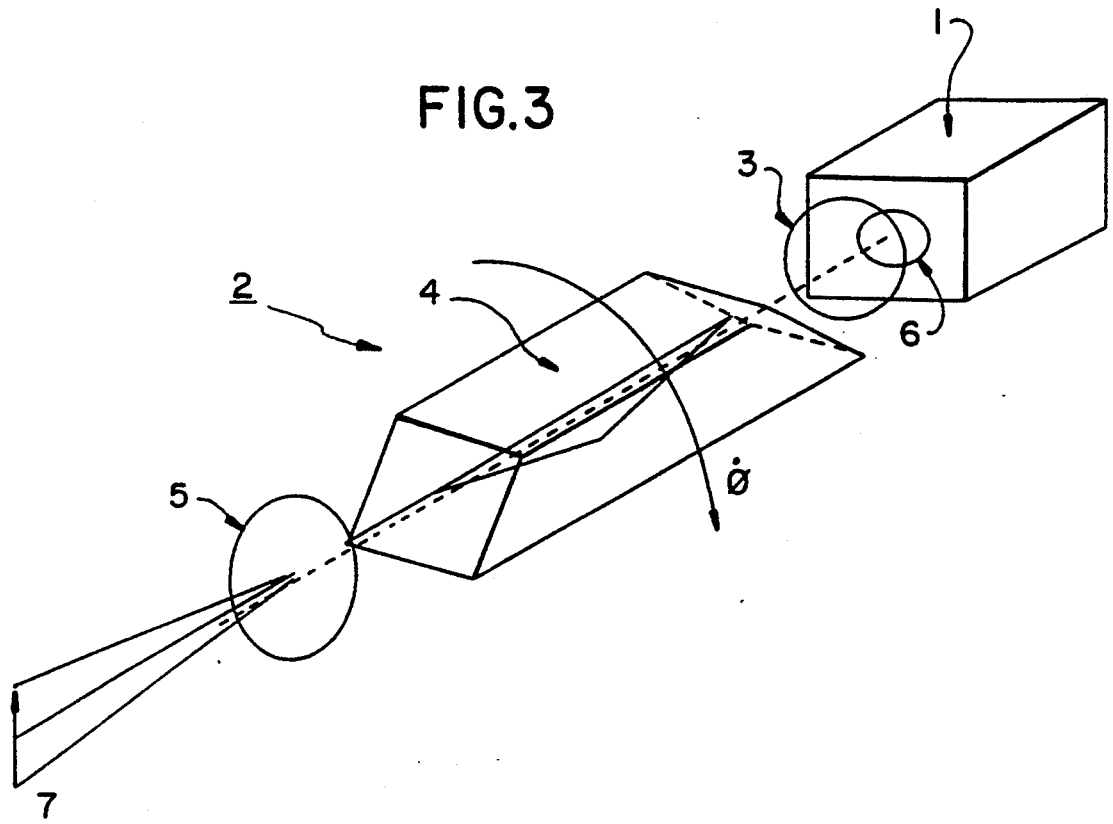
FIG. 3 is a schematic perspective diagram of an image rotation device suitable for use with the system of FIG. 1.

FIG. 3 shows a dove prism apparatus suitable for use as a "$\theta$" drive for camera 1. The apparatus includes camera 1, a relay lens 3, a rotating dove prism 4, and an imaging lens 5. The camera image plane is indicated by reference numeral 6 and the object itself by reference numeral 7. The position of the image in the camera imaging plane is determined by the rotational position of prism 4.

The scene imagery captured by camera 1 is input to an image digitizer and preprocessor 8 which binarizes the video image and transfers the binary video image to a spatial light modulator (SLM) 9. Image digitizer and preprocessor 8 can also be adapted to provide the image rotation means, and a digital video memory (not shown) may be included for temporary storage of the binarized image.

A laser beam 10 interacts with the image SLM and is modulated thereby to transfer the image information from preprocessor 8 to a coherent light beam. The modulated beam is then input to a lens 11 which takes the optical Fourier transform of the image. Both the image SLM and Fourier transform lens may take a variety of forms known to those skilled in the art, all of which are intended to be included within the scope of the invention.

The Fourier transformed beam is multiplied by an optical matched filter stored in a sequential digital binary phase optical filter (BPOF) memory 13, using an SLM 14 into which reference information from the filter memory 13 is loaded. In alternate embodiments using filter types other than binary phase optical filters (BPOFs), e.g., classical matched filters (CMFs), the transferred video image may contain Gray Scale rather than binarized information. The inverse Fourier transform of the product is taken by a second optical transform filter or lens 16 and a correlation plane video is formed to detect the autocorrelation at the image plane or other suitable focal plane detector of the TV camera 17.

The BPOFs are digital reference images of target objects which are stored sequentially in an electronic storage memory such as a magnetic or optical disk, and Fourier transformed upon retrieval. A different optical matched filter is provided for each object. The Fourier transformed reference image is used to modulate the beam, which effectively creates a "matched filter." In the preferred embodiment using a BPOF, only the phase is modulated, but the invention is also intended to encompass other types of matched filters. The number of images which can be stored is limited only by the size of the memory for example, about 160 images on a 40 MB hard disk.

In order to obtain the optical matched filters using SLM 14, suitable Fourier transform and conversion algorithms are utilized to process the reference images prior to input into SLM. The general form of the two-dimensional optical Fourier transform is given by the formula $$F(\mu,\nu) = \int\int A(x_1,y_1)\epsilon^{-j2\pi(\mu x_1 + \nu y_1)} dx_1 dy_1 \quad (1)$$

where $\mu$ and $\nu$ are the spatial frequencies of the image and $x_1$ and $y_1$ are the coordinates for the object $A(x_1,y_1)$. This is the optical transform/inverse transform operation used to obtain a mathematical inverse transform by taking a Fourier transform of a Fourier transform, which yields a negative or inverted image of the inverse transform with some constant factor.

Equation (1) can be solved by the application of a known fast Fourier transform algorithm, such as is used by the commercially available program sold under the trade name MATLAB. The reference image matrix stored in digital memory 13 is written as $x = f(x_1,y_1)$ and the input image is given by $n = T(x_1,y_1)$. The Fourier transformed input image N is given by $N = fft(n)$ and the transformed reference image is given by $X = fft(x)$. The matched filter is the complex conjugate of the Fourier transformed input image and is written as $X^* = $ conjugate (X).

The autocorrelation is given by $XA = IFFT(X \cdot X^*)$ and the cross correlation with the reference image is $NA = IFFT(N \cdot X^*)$. To obtain a phase only filter (POF) or binary phase only filter (BPOF), the phase is separated from the amplitude so that $X_p = X/|X| = $ the phase angle. The phase angle $X_p$ is then binarized to obtain the binary phase only filter by a signum function which assigns $+1$ for X greater than 0, 0 for $X = 0$, and $-1$ for X less than 0. Thus, the binarized XP can only take two possible angles, 0° or 180°.

The binarized phase filter $BPOF = X_b^* = $ signum $(X_p^*)$, and the BPOF autocorrelation is written as $x_{ab} = ifft(X \cdot X_b^*)$. The BPOF reference image cross correlation is therefore given by the formula $n_{ab} = ifft(N \cdot X_b^*)$.

Filter memory 13 includes an optical matched filter for each object to be identified. When the input object scene is rotated, an autocorrelation will appear whenever the scene rotates to include the selected object whose filter has been retrieved from memory 13, and applied to SLM 14. The angle $\theta_s$ at which the object correlates, i.e., at which the presence of a selected object is determined to be present, is recorded at that time and is used in a transformation matrix, described below, to obtain the object's scene coordinates. From these operations, it is possible to obtain unambiguous detection, location, and orientation of the object.

The correlation plane video may be processed by a correlation processor such as a video threshold circuit, or by a more elaborate digital processor depending on the requirements of Xt, Yt encoder 19. The video is then input to the Xt, Yt encoder 19, while image plane angle $\theta_s$ is input to encoder 21 which encodes the camera image plane angle $\theta_s$ and provides an input to the transformation resolver 20.

The position Xc, Yc position of the object in the correlation plane coordinates is encoded for the transformation resolver 20 by vertical and horizontal TV counters in encoder 19. A transformation resolver 20 then receives Xc, Yc and $\theta_s$ inputs with identification timing and performs the coordinate transformation from camera to scene coordinates by the matrix transformation $$\begin{bmatrix} X_s \\ Y_s \end{bmatrix} = \begin{bmatrix} \cos\theta_s & -\sin\theta_s \\ \sin\theta_s & \cos\theta_s \end{bmatrix} \begin{bmatrix} X_c \\ Y_c \end{bmatrix}. \quad (2)$$

Figure 2:
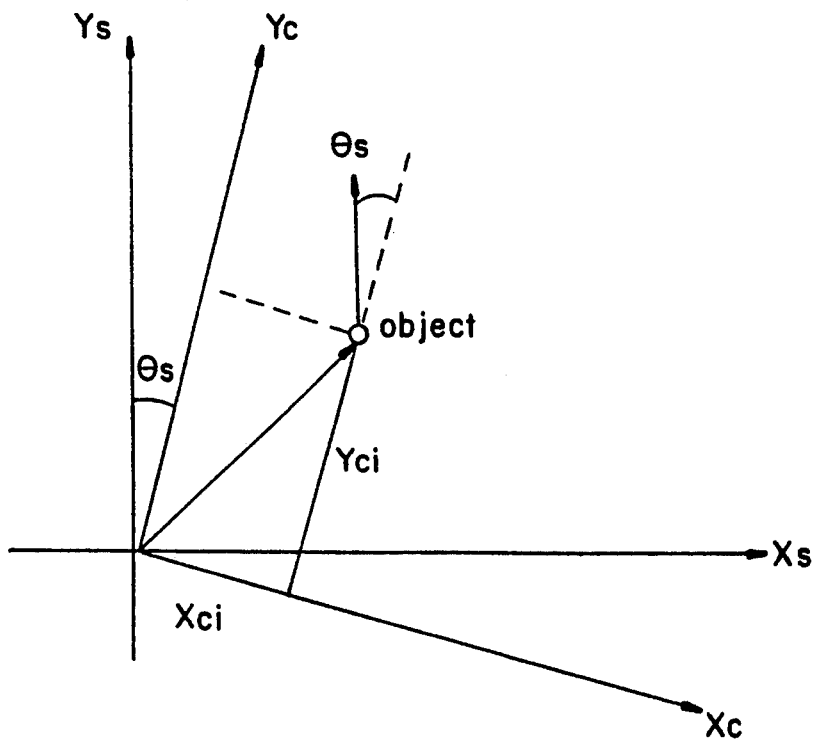
FIG. 2 illustrates the manner in which scene and camera coordinates are determined in the system of FIG. 1.

The outputs of the system are given in terms of the object identification, object orientation $\theta_s$, and object location in scene coordinates Xs,Ys. FIG. 2 shows the geometric relationships between scene coordinates Xs,Ys, camera angle $\theta_s$, and object coordinates Xc,Yc.

The scale factor between coordinate systems is not unity but is a constant which is factored into the final solution for object location. As the camera image plane is rotated, the angle $\theta_s$ is noted when a corresponding correlation occurs. Therefore, the orientation $\theta_s$ of the object can be obtained. The object position in the correlation plane is then transformed back to scene coordinates by equation (2).

The outputs of resolver 20 are input to a system controller 22, for example a robot controller system, which may also command the formation of optical filters. The robot then is able to retrieve the detected object.

It should be noted that the block components shown in FIG. 1 are not necessarily discrete components, but rather may be components which reside in a personal computer with suitable interface and decoder components. The invention as thus described provides for the digital storage of a user selectable parts or object library, electronic generation of optical filters combined with a circularly scanning scene camera for the detection of groups of multiple or individual parts in various orientations. It is capable of completely defining all stored and detected objects by issuing an identification, location in terms of suitable coordinates, and orientation angle for each detected scene object. The information may then be input into a robot controller, used in an autonomous guidance system for land, air and space vehicles, or used in a surveillance system.

Finally, because numerous variations of the invention will undoubtedly occur to those skilled in the art, it is to be understood that the invention should be defined solely by the appended claims and not be limited in any way by the above description.

We claim:

1. A system for determining the location and orientation of a plurality of objects in a moving image frame, comprising:
    image frame capture means for electronically capturing an image frame containing scene information;
    image frame moving means for causing said image frame to move in respect to a target coordinate system;
    storage means for storing reference image information about said plurality of objects, a separate reference image being stored for each object;
    optical filter means for comparing said reference image information with said scene information by modulating a beam of light carrying said scene information with said reference image information to obtain a correlation image;
    correlation means for detecting a selected one of said object in said correlation image; and
    transformation resolver means for determining a position and orientation of said selected object in respect to said target coordinate system.

2. A system as claimed in claim 1, wherein said image frame capture means comprises a television camera.

3. A system as claimed in claim 2, wherein said image frame moving means comprises a dove prism and means for rotating the dove prism.

4. A system as claimed in claim 2, wherein said image frame moving means comprises an electronic image processor including means for electronically rotating said image frame captured by said television camera.

5. A system as claimed in claim 2, wherein said optical filter means comprises means including a first spatial light modulator for converting said scene information into optical information in the form of a modulated coherent light beam, a second spatial light modulator responsive to input from a digital reference image storage memory for further modulating said coherent light beam with said reference image information.

6. A system as claimed in claim 5, wherein said second spatial light modulator forms a binary phase optical filter.

7. A system as claimed in claim 5, wherein said optical filter means further comprises Fourier transform means for performing a Fourier transform on said scene information modulated light beam.

8. A system as claimed in claim 7, wherein said optical filter means further comprises an inverse Fourier transform means for performing an inverse Fourier transform on said reference image modulated light beam.

9. A system as claimed in claim 5, wherein said correlation means comprises a television camera for capturing an electronic image of said reference image modulated light beam.

10. A system as claimed in claim 9, wherein said correlation means further comprises means for determining a correlation between said reference image information and said scene information and thereby determining whether said reference object is present in said image frame.

11. A system as claimed in claim 10, wherein said transformation resolver means comprises means for determining coordinates of a detected object in relation to said electronic image, means for determining the position of said electronic image in relation to said target coordinate system, and means for thereby determining the orientation of said object in said target coordinate system.

12. A system as claimed in claim 1, wherein said storage means comprises a digital electronic storage memory and means for transferring said reference image information to said optical filter means.

13. A system as claimed in claim 1, further comprising means for outputting position and orientation information concerning said selected object from said transformation resolver means to a parts retrieval system robot in order to enable said robot to automatically retrieve the selected object.

14. A system for interrogating an optical matched filter with moving scene images, comprising a video camera, means for moving an image plane of said camera, image supply means for supplying scene imagery from said camera to a first spatial light modulator means including a first spatial light modulator for transferring said scene imagery to a coherent light beam, and filter interrogation means for causing said scene imagery modulated light beam to interrogate said optical matched filter.

15. A system as claimed in claim 14, wherein said image plane moving means comprises a dove prism and means for rotating the dove prism.

16. A system as claimed in claim 14, wherein said image plane moving means comprises means for rotating said camera.

17. A system as claimed in claim 14, wherein said image plane moving means comprises means in said image supply means for electronically rotating said scene imagery.

18. A system as claimed in claim 14, wherein said optical matched filter is a second spatial light modulator.

19. A system as claimed in claim 18, wherein said optical matched filter further comprises a digital electronic storage memory and means for transferring reference object image information stored in said memory to said second spatial light modulator.

20. A system as claimed in claim 14, wherein said optical matched filter is a binary phase optical filter.

21. A system as claimed in claim 14, wherein said optical matched filter comprises a Fourier transform lens.

* * * * *